Patented Dec. 9, 1941

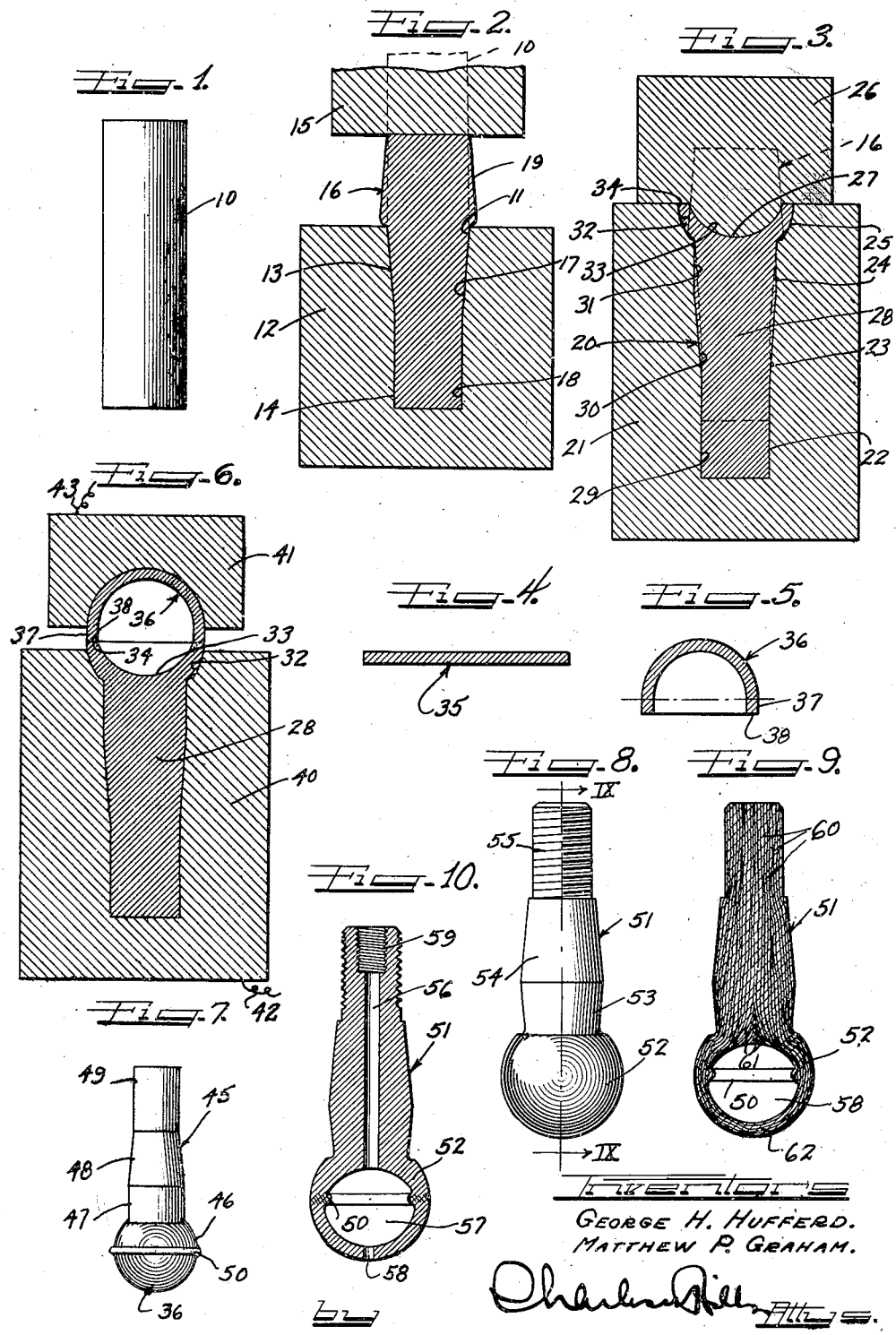

2,265,839

UNITED STATES PATENT OFFICE 2,265,839

JOINT STUD AND METHOD OF MAKING SAME

George H. Hufferd and Matthew P. Graham, Detroit, Mich., assignors to Thompson Products Incorporated, Cleveland, Ohio, a corporation of Ohio Application May 18, 1939, Serial No. 274,326

7 Claims. (Cl. 29—152)

This invention relates to ball studs for universal joints such as tie rod joints and includes a method of making such studs from a minimum amount of metal by stamping, extruding and upsetting operations.

More specifically this invention relates to a method of forming hollow headed ball studs including the die-shaping of metal rod stock to form a head thereon, the stamping of sheet metal stock to form a segmental spherical cap and the welding of the cap to the headed end of the die-formed stud to provide, with the head of the stud, a hollow ball having an outer surface defined by the sides of bowed metal grain bands.

According to this invention, cylindrical rod stock is shaped in dies to produce headed stud blanks without loss of metal. These stud blanks have the metal grain structure thereof extending from one end of the blank to the other end thereof so as to define all longitudinal surfaces of the blank with their sides only. Flat metal sheets are then stamped into hollow segmental spherical hollow caps with cylindrical collar portions defining the rim ends thereof.

The hollow metal caps, like the stud blanks, have their exterior surfaces defined only by the sides of the metal grain bands since they have been formed by stamping operations which merely bow the grain bands.

The hollow segmental spherical metal caps are then butt-welded to the heads of the stud blanks. The cylindrical collar portions at the rims of the metal caps are melted down to form the welding metal so that a semi-spherical cap mates with a semi-spherical head on the stud blank to form together a hollow ball end of a stud.

The studs of this invention can have their shank portions tapered inwardly adjacent the ball ends thereof so as to accommodate increased tilting movement. This tapered portion can be formed by a lathe turning operation which also removes welding flash and any irregularities on the ball end of the stud.

Since the studs of this invention preferably have hollow head portions, the cavity in the head can be used as a reservoir for lubricant. According to one modification of the invention the shank of the stud can be axially drilled to communicate with the head cavity. The top end of the shank can then be provided with a lubricant fitting and lubricant can be forced into the head cavity. A small opening can be provided in the head to allow lubricant to issue from the cavity for lubricating the bearing surfaces of a joint in which the stud is mounted.

It is, then, an object of this invention to provide ball studs for universal and the like type joints without loss of metal.

Another object of the invention is to provide ball studs for universal and the like joints of improved metal grain structure.

A further object of the invention is to provide ball studs for tie rod joints by die-pressing operations.

A specific object of the invention is to provide a hollow-headed ball stud for universal and the like joints.

Another object of the invention is to provide a ball stud having a lubricant reservoir in the head thereof.

A further object of the invention is to provide ball ended studs for universal and the like joints wherein the surface of the ball is defined by the sides only of the metal grain bands.

A further object of the invention is to eliminate the waste of material heretofore necessary in the manufacture of ball studs.

Other and further objects of the invention will become apparent to those skilled in the art from the following detailed description of the annexed sheet of drawings which discloses preferred embodiments of the invention:

On the drawing:

Figure 1 is an elevational view of a cylindrical rod from which the studs of this invention can be prepared.

Figure 2 is a vertical cross-sectional view taken through the central portion of dies used in the first step of the process of this invention illustrating the manner in which the cylindrical rod of Figure 1 is extruded and upset by the dies.

Figure 3 is a vertical cross-sectional view taken through the central portion of other dies showing the second step in the process of this invention for upsetting a hollow head portion on the blank.

Figure 4 is a vertical cross-sectional view of a flat metal disc used according to this invention.

Figure 5 is a vertical cross-sectional view of a hollow segmental spherical cap member coined from the disc shown in Figure 4.

Figure 6 is a vertical cross-sectional view taken through the central portion of a jig and illustrating the welding of the hollow cap of Figure 5 onto the hollow headed end of a stud blank.

Figure 7 is a side elevational view of a ball ended stud prepared according to this invention.

Figure 8 is a side elevational view of a modified form of ball stud prepared according to this invention and having a tapered neck portion adjacent the ball end thereof to accommodate increased tilting movements of the stud.

Figure 9 is a vertical cross-sectional view taken along the line IX—IX of Figure 8 and illustrating the metal grain band formation of the stud.

Figure 10 is a vertical cross-sectional view of a further modified stud according to this invention having an axially bored shank portion providing a duct to supply the cavity in the head of the stud with lubricant.

As shown on the drawing:

In Figure 1 the reference numeral 10 designates a solid cylindrical metal rod from which the studs of this invention can be prepared without loss of any metal.

As shown in dotted lines in Figure 2, the rod 10 is placed over the mouth 11 of a die 12 having a tapered well 13 extending from said mouth 11 and converging toward a smaller cylindrical bottom portion 14. The mouth 11 is just large enough to receive the end of the rod 10.

A flat bottomed top die or plunger 15 is then pressed down on top of the rod 10 to force the rod into the die 12 thereby flowing metal from the bottom of the rod upwardly to produce a stud blank 16. The downward stroke of the plunger 15 terminates in spaced relation above the die 12.

The valve blank 16 formed by this first die-pressing operation has an intermediate tapered portion 17, a cylindrical end portion 18 of smaller diameter than the original rod, and an enlarged head portion 19 above the die 12.

As shown in Figure 3, the valve blank 16 is next seated in the well 20 of a die 21. As shown in dotted lines, the blank 16 does not conform with the shape of the well 20.

The well 20 has a cylindrical bottom portion 22 of about the same size as the cylindrical portion 14 of the die 12, an intermediate tapered portion 23 converging outwardly from the cylindrical portion 22, a cylindrical intermediate portion 24 above the tapered portion 23, and a hemispherical portion 25 at the top thereof.

A top die 26 having a segmental spherical projection 27 extending from the flat bottom thereof is provided for forcing the valve blank 16 into the die 21. The segmental spherical projection 27 of the die 26 is smaller than the semi-spherical portion 25 of the well 20.

The top die 26 is forced against the die 21 to produce a stud blank 28 from the blank 16. The blank 28 has a cylindrical bottom portion 29, a tapered portion 30 converging outwardly from the top of the cylindrical portion 29, an intermediate cylindrical portion 31 at the top of the tapered portion 30 and a segmental spherical head portion 32 at the top end thereof. The head portion 32 has a segmental spherical recess 33 therein. An annular rim portion 34 is thus formed on the top of the stud between the recess 33 and the outer surface of the head 32.

As shown in Figures 4 and 5 a flat metal disc 35 is coined by a simple stamping operation to provide a segmental spherical hollow cap 36. The cap 36 preferably has a cylindrical collar portion 37 at the mouth thereof so that the finished stamping includes a semi-spherical member with a cylindrical flange around the mouth thereof. The cap member thus has an annular rim 38.

As shown in Figure 6, the stud blank 28 is inserted in a jig 40 with the segmental spherical head portion 32 thereof projecting from the jig.

The cap member 36 has the rim 38 thereof placed on the rim 35 of the stud blank 28. A jig 41 can receive the cap member 36 to hold the same in proper alignment on the head of the stud blank.

The jigs 40 and 41 can be connected with a source of current through wires 42 and 43 respectively so as to butt-weld the cap 36 to the stud head 32. The jigs 40 and 41 are urged together during the butt-welding operation and the heat developed by the electrical current flowing between the jigs will melt down the collar portion 37 of the cap 36 for integrally uniting the two parts.

A ball stud 45, shown in Figure 7, is thus produced. This ball stud has a ball end 46, a cylindrical shank portion 47 adjacent the ball end 46, a tapered intermediate shank portion 48 and a cylindrical top portion 49. As shown in Figure 7, an annular bead 50 may be formed around the periphery of the ball end 46 from the butt-welding operation. This bead metal or welding flash is also formed on the inside of the ball end 46.

The stud 45, as shown in Figure 7, is adapted for use by threading the cylindrical end 49 and by removing the bead 50.

As shown in Figure 8, however, a modified ball stud 51 can be formed from the stud 45 by tapering the cylindrical portion 47 of the stud inwardly toward the ball end thereof so as to neck down the stud shank adjacent the ball end for permitting greater tilting movements of the stud. As shown in Figure 8 the stud 51 has a ball end 52, a tapered neck 53 converging outwardly from the ball end, a reverse tapered intermediate shank portion 54 and a threaded cylindrical top portion 55. As is customary in tie rod and the like universal joints, the ball end 52 of the stud will be seated in a joint housing in tiltable and rotatable relation thereto and the neck 53 will project through an opening provided in the housing. Since this neck 53 tapers inwardly, the opening in the housing can be smaller or the stud can tilt through greater angles without contacting the housing. The tapered portion 54 of the stud usually receives an eye therearound which is held on the stud by means of a nut threaded on the threaded end 55.

If desired, as shown in Figure 10, the stud 51 can be provided with an axial bore 56 extending through the shank thereof into the hollow cavity 57 of the ball end 52. The ball end 52 can have a small grease hole 58 drilled therethrough.

The top of the shank can be internally threaded as at 59 for receiving a lubricant fitting (not shown). In this manner the studs of this invention can be readily adapted for storing lubricant to lubricate the bearing surfaces of a joint in which they are used. Thus lubricant is merely forced through a lubricant fitting on the joint stud and through the bore 56 to fill the cavity 57 in the ball end of the stud. The lubricant stored in the cavity 57 can then work out of the cavity through the hole 58 as it is needed to lubricate the interior of the joint.

As shown in Figure 9, the metal grain bands 60 of the studs of this invention extend substantially parallel with the long axis of the stud and are bowed outwardly at the ball end 52 of the stud as at 61. This grain band formation is obtained since the metal has been worked entirely by die-pressing and extrusion operations and not by lathe-turning operations which cut through the grain of the metal thereby exposing the ends of the grain bands on the bearings surfaces of the ball head.

It will also be noted from Figure 9 that the grain bands 62 defining the lower portion of the ball head 52 are bowed around the head since this portion of the head was formed by a coining operation and not by a cutting operation. Thus the entire bearing surface of the ball head 52 is defined by the sides only of the grain bands. Likewise, the exterior side surfaces of the stud shank are defined entirely by the sides of the grain bands.

This grain structure is highly desirable in imparting strength and wearing properties to the joint studs of this invention. Since the grain bands can be compared with bundles of fibers or bristles, it is obvious that bearing surfaces defined by the ends of the fibers or bristles will have to be highly machined and polished to provide smooth surfaces. Furthermore, since the grain structure of studs formed by the usual lathe-turning operation necessarily follows the axis of the stud, those grain bands defining the headed portion are not tied in with the main body portion of the stud and can be broken off more readily than when these bands are bowed outwardly from the main body portion of the stud.

Metallurgically, therefore, the studs of this invention have far superior wearing qualities and strength than the ordinarily prepared lathe-turned studs and can be formed at lower cost with no loss of metal while it was heretofore necessary to waste large amounts of metal.

It will, of course, be understood that various details of the process and product may be varied through a wide range without departing from the principles of this invention and it is, therefore, not the purpose to limit the patent granted hereon otherwise than necessitated by the scope of the appended claims.

We claim as our invention:

1. The process of making joint studs which comprises die-pressing a cylindrical rod to reduce the size of one end thereof and increase the size of the other end, upsetting the enlarged end to produce a recessed head portion, and welding a separate metal member on the end of said head portion to form therewith a complete stud head.

2. The process of making ball studs which comprises die-shaping a solid metal rod to produce a stud blank having a cylindrical end, a generally tapered portion continuing from said end, and an enlarged recessed segmental spherical head without loss of any metal from the original rod, stamping a flat sheet of metal to provide a hollow segmental spherical cap with an upstanding cylindrical portion at the open end thereof, and melting down said cylindrical portion to weld the cap to the rim of the recessed stud head for forming therewith a hollow ball end on the stud.

3. A joint stud for tie rod joints and the like universal joints which comprises a member having a hollow head portion whose outer surface is defined entirely by the sides of metal grain bands and an elongated shank extending from said head portion, said shank having a duct therethrough communicating with the interior of the head portion and said head portion having an opening therethrough communicating with the interior thereof.

4. In a ball stud for tie rod joints and like universal joints the improvement which comprises a ball head composed of integrally united die-shaped members whose metal grain bands are bowed for defining an exterior ball shaped bearing surface with their sides only.

5. The process of making joint studs for tie rods and the like universal joints which comprises die-pressing a metal rod to increase the size of an end thereof, upsetting the enlarged end of the rod in a die with a plunger having a rounded end to produce a hollow segmental spherical head portion with a peripheral rim around the open end thereof, stamping sheet metal into hollow segmental spherical cap form with a rim around the open mouth thereof, and butt-welding the rim of said cap to the rim of said head and thereby form a hollow ball head.

6. In the process of making ball studs the steps which comprise pressing an upstanding cylindrical portion of a semi-ball shaped cap against the semi-ball shaped head of a stud and melting down said cylindrical portion to weld the cap to the head for forming a full ball end on the stud.

7. A joint stud for tie rod and the like universal joints which comprises a metal member having a shank and an integral full hollow ball-shaped end whose outer surface is defined entirely by the sides of the metal grain bands, and said ball end having an opening therethrough giving access to the chamber defined by the ball.

GEORGE H. HUFFERD.
MATTHEW P. GRAHAM.